United States Patent
Brewster

[15] 3,638,216
[45] Jan. 25, 1972

[54] CHARACTER GENERATION SYSTEM
[72] Inventor: Arthur Edward Brewster, Cheshunt, England
[73] Assignee: International Standard Electric Corporation, New York, N.Y.
[22] Filed: Mar. 24, 1969
[21] Appl. No.: 809,896

[30] Foreign Application Priority Data
Apr. 4, 1968 Great Britain..................16,157/68

[52] U.S. Cl..................340/324 R, 95/4.5 R, 178/6.7 R, 178/15
[51] Int. Cl..................................................G06f 3/14
[58] Field of Search..................340/324.1, 324 A; 95/4.5 R; 178/15, 6.7 R

[56] References Cited

UNITED STATES PATENTS

| | | |
|---|---|---|
| 3,267,454 | 8/1966 | Schaaf..................340/324 |
| 3,296,609 | 1/1967 | Wilhelmsen..................340/324 |
| 3,438,001 | 4/1969 | Langtry et al...................340/324 X |
| 3,466,612 | 9/1969 | Myers et al....................340/324 X |
| 3,500,470 | 3/1970 | Barker et al....................340/324 |

Primary Examiner—David L. Trafton
Attorney—C. Cornell Remsen, Jr., Walter J. Baum, Percy P. Lantzy, Philip M. Bolton, Isidore Togut and Charles L. Johnson, Jr.

[57] ABSTRACT

The invention provides a character generation system for converting input data signals into driving signals for a full-page-width mosaic printer or display. The number of columns of a storage matrix which are scanned during the generation process is determined by the character set into the matrix; thus the length of line occupied by a character is determined by the size of the character.

Facilities for line justification and the generation of bold, italic and varying-size characters are also outlined.

19 Claims, 8 Drawing Figures

CHARACTER GENERATION SYSTEM

BACKGROUND OF THE INVENTION

The invention relates to a character generation system, having particular but not necessarily exclusive application to electrographic printing and/or display apparatus which is defined as apparatus of the kind wherein the recording surface of either a print drum or band is selectively magnetized or electrostatically charged to form a pattern or latent image thereon representative of information contained in a signal applied to the apparatus, and wherein the print drum or band is passed through or relative to a powder applicator containing powder that is attracted to the latent image to develop same and to form a powder image which may be viewed at a display position and/or transferred to a permanent record by printing means which form part of the apparatus.

It is characteristic of data printers, ranging from low-speed teleprinters to high-speed line-at-a-time printers, that they print a constant character width, after the manner of a typewriter. This limitation is often imposed by the method used to achieve the character increments across the width of a page. However, more attractive and readable copy can be achieved by tailoring the character width increments to suit the ideal shapes of the individual characters. The ability also to make critical adjustments of word spacing, so as to achieve "line justification," is a further contribution that improves the overall appearance of a printed page. This philosophy is markedly opposed to that of the typewriter, in which the characters themselves are distorted so as to make the most acceptable use of the constant-width increment but are thereby noticeably degraded in appearance. An equally important feature of character width control is that in the printing of a given text the consumption of paper on which the text is printed can be reduced by as much as 30 percent.

SUMMARY OF THE INVENTION

The invention provides a character generation system including at least one storage matrix within which is sequentially formed at least part of each one of a plurality of characters that is to be generated by said system, wherein the number of columns of said storage matrix, sequentially scanned during the interrogation of a row thereof, is determined in relation to the width of the character formed in said storage matrix, wherein during the interrogation of said row those parts of the matrix which form part of the character cause signals corresponding thereto to be generated at the output of said storage matrix, said signals being sequentially directed to the appropriate input channels of character-forming means, the sequential scanning of the columns of said storage matrix being synchronized with the alerting of the appropriate input channels of said character-forming means, and wherein the sequential formation in said storage matrix of at least part of each one of said plurality of characters is repeated until signals representative of the complete form of said plurality of characters has been directed via the appropriate input channels to said character-forming means.

BRIEF DESCRIPTION OF THE DRAWINGS

The foregoing and other features according to the invention will be better understood from the following description with reference to the accompanying drawings in which.

DESCRIPTION OF PREFERRED EMBODIMENTS

It is to be assumed by way of example that the character generation system according to the invention which includes the facilities of variable character width and spacing utilizes a ferrite-core storage matrix but it will be evident from the subsequent description that the same mechanism for the facility of variable character width and spacing may be realized with other types of storage matrix.

The character generation system according to the invention will be described by way of example to provide the facilities to drive the 880-track (80 characters) recording head assembly of an electrographic printing and/or display apparatus as any speed up to speeds of 80,000 characters/second although it could be adapted for use with a cathode-ray tube display.

Figure 1A:
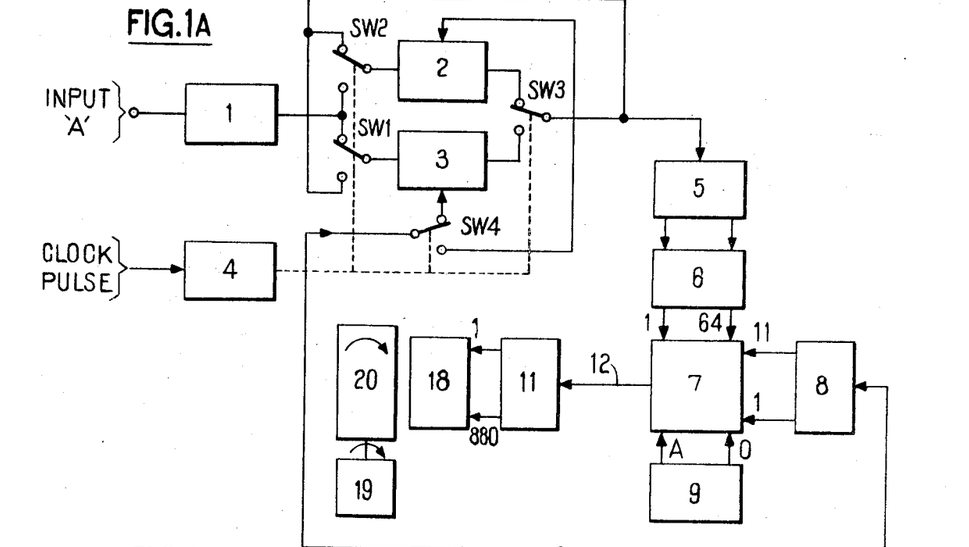
FIG. 1A illustrates in the form of a block diagram a character generation system.

When the character generation system is used in an electrographic printing and/or display apparatus it could be arranged as shown in the drawing according to FIG. 1A. With electrographic printing and/or display apparatus the initial recording is made by a multiple recording head assembly 18 extending the full width of the print drum 20 which is capable of being rotated by a motor 19 and hence embracing the total width occupied by, to quote the above example, 80 characters. The multiple recording head assembly 18 comprises a single row of individual heads, each capable of writing a dot on the drum surface. The dot size and spacing is typically such as to write 160 dots per linear inch. Thus, energizing the recording heads simultaneously, or serially from one end of the row to the other, will record a continuous row of dots across the width of the drum 20 so as to represent a continuous thin, straight line. When the drum 20 is in motion i.e., rotated by means of the motor 19, successive scans across the array of recording heads 1 will cause a succession of lines to be recorded across the width of the drum 20. In normal operation the relationship between the drum speed and the scanning speed of the energizing signal for the array of recording heads 18 is such that after the completion of one line scan the drum surface will have moved through the height of one dot, i.e., the width of the elementary scanning line. The process is therefore exactly equivalent to the buildup of an uninterlaced TV scanning raster.

The character generation system according to the invention accepts incoming dense codes having for example six digits and converts these into dot patterns appropriate to a selected character. In order for the character generation system to perform this function, it is necessary for each of the desired character shapes to be initially stored as a configuration of dots on a standard matrix. Such a matrix might typically be 11 dots wide by 15 dots high. It is thus only necessary for the incoming code to select the matrix holding the relevant character shape and offer this matrix to be read out into the array of recording heads 18.

In order to print a line of characters, the recording sequence is such that the top row of dots for every character in the line must have been completely recorded before it is possible to proceed to the second or subsequent rows of dots. With the matrix size quoted above it will, of course, be necessary to record a total of 15 successive rows of dots so as to complete the printing of the line of characters. Earlier published examples of this mechanism have required that the matrices should extend to cover the full width of the printed line, so that the complete font of alternative characters could be made available at every character position along the line. The selection process of the character generation system according to the invention achieves the same end with much greater economy in that a single font of character matrices is switched so as to serve each character position in turn.

Although not essential to the basic system, or to the elaborations here to be proposed, the following description with reference to the accompanying drawings will be related to the use of a ferrite-core character selection matrix. This has the feature that a complete font of, say, 64 alpha-numeric characters can be provided in a single-character-sized core matrix, by allocating to each character a wire which links the cores in a configuration appropriate to the desired character shape.

The basic recording sequence is such that all the character codes in the line must have been received and stored before the line of characters can be printed, i.e., the data applied to the character generation system is assembled into a coded character and transferred to a line storage unit by a line input unit. It is therefore essential to provide a storage unit which will contain at least one complete character line if repeated retransmission is to be avoided. With only one character-line store it is necessary to refill this store during the time taken to move the print drum or band a distance equal to the inter line gap. This time is obviously restricting and requires a high data transmission rate between the system and the processor. This situation is overcome as shown in FIG. 1A by arranging for the character generation systems line storage unit to be provided with two character-line stores 2 and 3, each capable of storing a plurality of coded characters, so that while the full store is being converted to printed characters the other is being filled with incoming character codes.

As shown in FIG. 1A, all incoming data for example, from a tape reader or line appearing at the input 'A' passes through an interface logic unit 1 wherein the character rate waveform is extracted, the characters are assembled for parallel transfer to line stores 2 and 3 and the transfer to the line stores 2 and 3 is initiated. Two data stores are required since data will be arriving at the input 'A' while the last received data is being printed on the paper strip for example.

In addition, the interface logic unit 1 detects the beginning and the end of message conditions to signal the printer and control the data sources.

The two line stores alternate their functions under the control of a changeover logic unit 4. This action is illustrated in the drawing according to FIG. 1A where, for example, store 3 is shown connected to the input 'A' via one way of a two-position switch SW1 i.e., contact position 1 and the interface logic unit 1, and store 2 is connected to a serial-to-parallel converter 5 which ultimately controls character formation via one way of a two-position switch SW2 i.e., contact position 1.

The switches SW1 and SW2 are arranged such that when the output of either of the line stores 2 and 3 is applied to the input of the converter 5 it is also applied to the input of that store, i.e., in the illustrated arrangement the input signal applied to the converter 5 is also applied to the input of the line store 2 via contact position 1 of the switch SW3, thus during operation the stored information is continually recycled.

The switch SW4 connects an output of a character-dot distributor 8 to the line store whose contents are being applied to the converter 5, this output signal being arranged to step the stored information through the line stores at the required rate.

The changeover logic unit 4 causes the switches SW1 to SW4 to be switched to the other of the two positions i.e., contact position 2 when one line has been printed from one data store and the other data receiving store has been filled with the next line to be printed thereby initiating the function interchange. When this occurs the line store 2 is connected to the input 'A' and the line store 3 is connected to the converter 5.

It should be noted that the switches SW1, SW2, SW3 and SW4 shown in the drawing according to FIG. 1A would in practice be electronic switching units.

The serial character coded outputs of the line store 2 and 3 are converted into parallel codes by the converter 5 and applied to a ferrite-core matrix 7 via a decoder 6. The decoder 6 decodes each one of the parallel character codes into a discrete signal on one of say 64 character wires. Each one of the 64 character wires is threaded through the cores of the 11×15 ferrite-core matrix 7 which correspond to the dots of the particular character concerned. Hence the character shape is generated by switching the required cores with a current waveform.

Figure 1B:
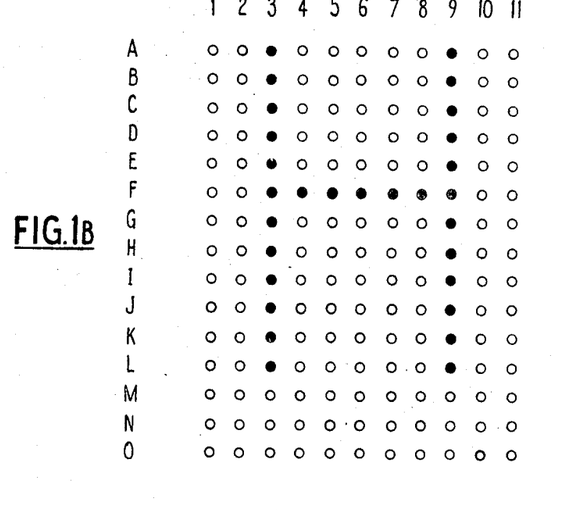
FIG. 1B diagrammatically illustrates an 11×15 ferrite-core storage matrix which forms part of the character generation system illustrated in FIG. 1A.

FIG. 1B symbolizes a ferrite-core matrix 11 elements wide by 15 elements high which forms the block 7 in the character generation system shown in the drawing according to FIG. 1A. The rows of dots are marked A to O and the columns of dots are marked 1 to 11 i.e., an 11×15 dot matrix and it will be noted that the character "H" occupies only the first 12 rows i.e., rows A to L, the other three rows M to O are used for lower case letters which have a part thereof that extends below the normal datum of the line of characters, for example those parts of the lower case letters $g$ and $j$ which extend below the normal datum. It should be noted that access wires are provided for each row and column of cores in addition to the wires which link the cores for each of the characters to be represented. An output wire 12 which links every core in the matrix is also provided. When a character code is read out of one of the line stores 2 and 3 it will drive its appropriate character wire and set the cores linked by that wire. In the diagram it has been assumed that the matrix 7 has been set by the character "H" and the set cores have been shown as solid discs. The unset cores are shown as open rings.

As outlined in a preceding paragraph it is assumed by way of example that the recording head assembly 18 is provided by a row of 880 heads and capable of printing a line of 80 characters, each 11 dots wide.

To start the line-printing sequence, the character code is arranged to set the matrix 7 for a particular character shape i.e., the character "H" as shown in FIG. 1B. Access wire A, for the top row of dots, is energized by means of a matrix row selector unit 9 and remains so until the whole page-width row of dots has been printed. The dot-access wires are now successively energized by means of a character dot distributor 8 in the order 1, 2, 3, 4, 5, 3 4 5 etc., while the recording heads 18 are also alerted in the same succession by means of a head pulse distributor 11. The matrix output winding 12 is so connected that an output which might occur at any given sampling instant will drive the recording head which happens to be alerted at that instant. This head will then write a dot on the drum 20. As the sequence proceeds, any cores which have been set by the selected character will be reset so as to produce such an output. The final assembly of recorded dots on the drum 20 will thus exhibit a pattern representative of the desired character shapes.

Continuing the scanning sequence, after 11 successive steps the whole of the top row of the matrix will have been read out, and the first 11 heads will have been energized or not, according to the character information in the top row. The matrix is then completely reset (all rows) and again set, this time by the character wire selected by the second character code in the line store. The second character code is extracted from the line store by means of the distributor 8 which after successively applying the 11 interrogation pulses to the columns of the matrix 7 applies a signal to the line store via the switch SW4 to cause, for the quoted example, the next six bits of information to be applied to the converter 5. The matrix scan is now repeated from 1 to 11 by means of the distributor 8, but this time coincident with the alerting by the head pulse distributor 11 of heads 12 to 22. The top row of dots for the second character is thus recorded in its correct position to the right of the first.

This sequence continues until the top rows of all 80 characters have been recorded. The core matrix 7 will have been traversed 80 times and the page-width recording head assembly 18 will have been traversed once.

Access wire B is now energized by means of the selector unit 9, instead of A, and the whole of the above sequence is repeated so as to write the second row of dots for all the characters in the line. By the same means the remaining rows of dots are written by successively energizing access wires C to O by means of the selector unit 9, repeating the sequence each time. The whole line of characters has now been printed on the drum 20, so the first character-line store can be reset and reconnected to the incoming data stream by means of the changeover logic unit 4. After a suitable delay, adjusted to establish the required interline spacing on the drum 20, the second character-line store which is now full of character codes, is interrogated to select the characters for the next line printing sequence.

The character generation system outlined in the preceding paragraphs with reference to FIG. 1A presupposes a standard character spacing of 11 dots. Thus a wide character, for example an "M," might occupy a width of nine dots between positions 2 and 10, inclusive of the matrix shown in FIG. 1B, allowing positions 1 and 11 for intercharacter spacing. However, a narrow character such as "I" for example, or a punctuation mark, must necessarily be placed in the middle of an excessive width of intercharacter space.

It is not essential for the character-dot distributor 8 to complete its full cycle of 11 steps. For a narrow character it would be permissible to reset the character-dot distributor 8 before its cycle had been completed, then allow it to restart immediately for the next character. It would be necessary in this instance to arrange the character generation system in a manner according to the invention i.e., such that the act of resetting the distributor 8 will also reset the matrix 7 and load it with the next character. Since under these circumstances the head-pulse distributor 11 will continue to step forward unhindered, the effect will be to allocate to each character an increment appropriate to the number of steps completed by the character-dot distributor 8 in reading out that character.

In order to obtain this mode of operation it is necessary to provide a reset signal to the character-dot distributor 8 after the required number of steps i.e., the number appropriate to the particular character, have been completed.

Figure 1C:
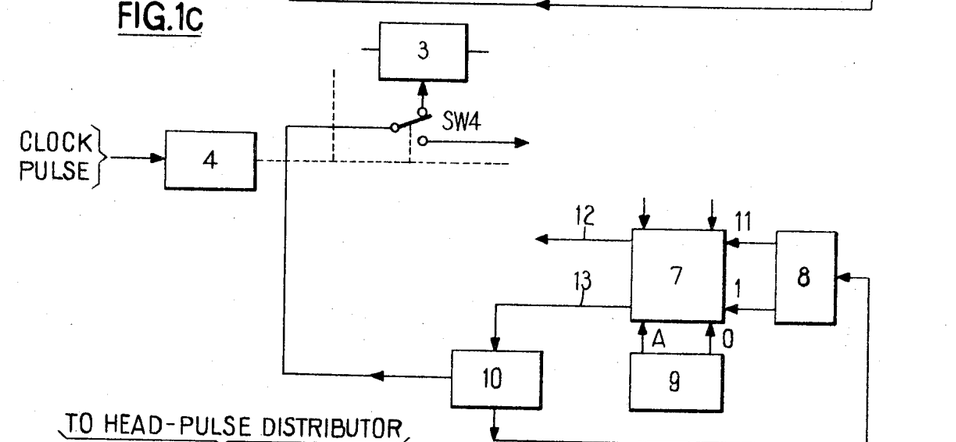
FIG. 1C illustrates part of the character generation system according to FIG. 1A modified in a manner according to the invention, FIGS. 2A and 2B diagrammatically illustrate an 11×16 ferrite-core storage matrix which forms part of the character generation system illustrated in FIG. 1C.

This can be achieved by modifying the character generation system according to FIG. 1A in a manner as shown in the drawing according to FIG. 1C which illustrates part of the character generation system according to FIG. 1A together with a reset unit 10 the outputs of which are utilized to reset the character-dot distributor 8 and to cause the stored information to be stepped through the line stores at the desired rate.

Figure 2A:
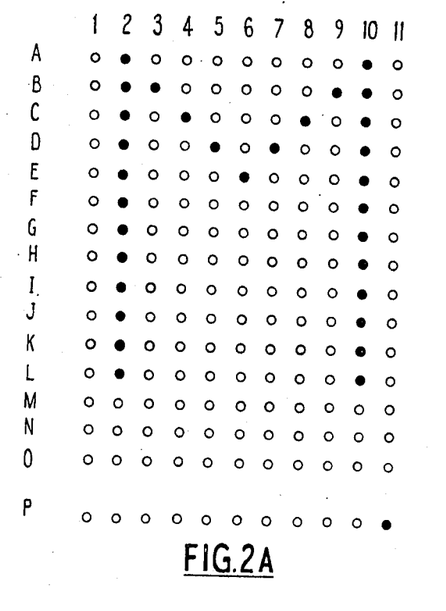
Figure 2B:
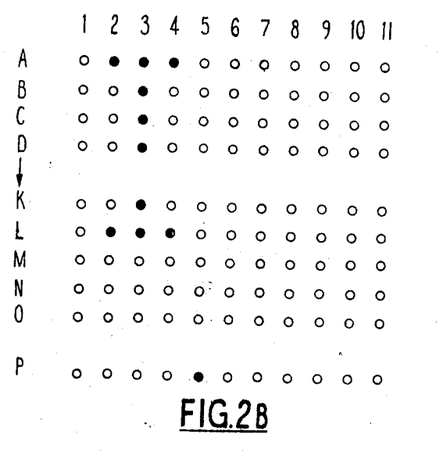

The matrix 7 for this arrangement of the character generation system which is shown in the drawings according to FIGS. 2A and 2B is provided with an additional row of cores designated P. Each core of this additional row will be linked by one of the (numbered) dot-access wires, double-wound or its equivalent, so that the access current in that wire alone is sufficient to reset the core. Each character wire, besides linking the matrix 7 in the usual manner according to the character shape, will now also be made to link one of the P cores. The particular core chosen will be arranged to correspond with the last dot embraced by the increment required by that character width and an output wire 13 linking all the P cores is connected via the reset unit 10 to the character-dot distributor 8 and to the line stores 2 and 3 via the switch SW4. One of the outputs of the reset unit 10 is utilized to reset the character-dot distributor 8 immediately upon an output pulse appearing on the wire 13, and the other of the outputs causes the contents of one of the line stores to be stepped along by an amount equivalent to one character code, i.e., in the quoted example, this output causes the next six bits of the stored information to be applied to the converter 5.

In operation, the act of setting the matrix 7 with the character shape will also set the appropriate P core. As the character-dot increments are successively read out, the point will be reached at which the P core will also be reset. This will as previously stated immediately reset the character-dot distributor 8 and the sequence for the next character will begin.

In order to exploit this facility to the full, it is necessary to arrange for the narrower characters to be displaced appropriately to the left of the matrix. For example, in FIG. 2A the letter "M" is shown placed centrally in the matrix with a single dot space on either side. Its character winding links the P core occupying position 11 in the matrix. Thus the letter M is allowed to occupy an 11-dot character increment. However, the letter I, shown in FIG. 2B, requires only five dot-increments including spaces, so its winding links the P core in position 5 on the matrix.

It will be evident that this mechanism will operate as each (lettered) row in the matrix 7 is read out, so the same space allocation will be maintained for the complete printing of that character.

In preparing a justified line of type it is necessary to make critical adjustments in word spacing in order to maintain good appearance. Electronic typesetting procedures allocate specific character codes to defined space increments. In the arrangement according to the invention, an extreme example would be to allocate a character code to each of the possible increments up to 11. The relevant character windings would not link the matrix 7 proper, but would only link the P core appropriate to the increment required. Thus the code for a one-dot space would set P core 1, the code for a six-dot space would set P core 6, and so on. To set up, say, a 27-dot space the codes for 11, 11 and 5 might be sent.

If the character generation system according to the invention is to be used in conjunction with an electrographic printing and/or display apparatus wherein a proofsetting facility is required, it is not essential for the proofsetting facility to preserve the perfection of character shape that must be achieved in the final printed text. It is usually sufficient for this application to provide a recognizable indication that the correct font has been set. This can be achieved by distorting a standard font into simulations of other desired fonts for example a standard upright font may be converted into an italic font by the method outlined in the following description with reference to the drawing according to FIG. 3.

Figure 3:
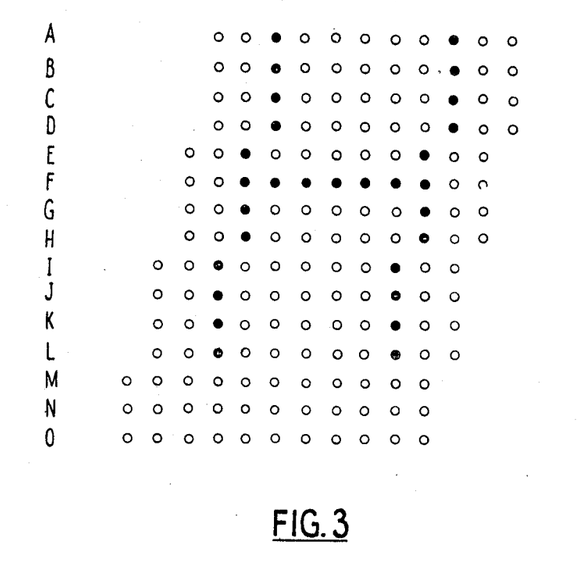
FIG. 3 illustrates an italic character.

An upright character, for example the letter "H" shown in FIG. 1B, can be converted to an italic character by displacing the character to the right by an amount which decreases progressively from the top to the bottom, as illustrated in FIG. 3. This can be achieved by inserting a delay of a specified number of dot increments between the head-pulse distributor 11 scan and the character-dot distributor 8 scan. This delay is made greatest while recording the top of the character and is progressively reduced until the required degree of distortion is achieved.

As shown in FIG. 3, the rows A to L are used for the capital letter "H" and as previously stated in a preceding paragraph the three rows M to O are used for those parts of the lower case letters which extend below a normal datum for the line of characters i.e., below the row of dots designated "L." In practice, rows F to L would be used for that part of the lower case letters which extend above the normal datum therefore the lower order letters will occupy rows F to O. The overall effect of the delay, as shown in FIG. 3, is to displace sections of the matrix such that the normally upright character is converted to an italic character and this displacement results, in the example quoted in a displacement of three dot-increments between the top and bottom sections of the matrix.

It will be evident that, when a space of a given width is inserted, all the remaining characters in the line will be displaced to the right by that amount. To achieve the italic character the top of the upright character might be displaced by, say, two dots in relation to its bottom i.e., as shown in FIG. 3. Hence at any point in the line of characters a three-dot space might be inserted in the top row of dots of the matrix so that in this row all subsequent characters are displaced to the right by three dots. In subsequent rows the inserted space increment would be made less, until in the bottom row of dots of the matrix no space increment would be inserted. This condition could be set up by reading in an italic-font shift code. To allow time for handling this code it is convenient to assume that for letters of all orders the actual shift would be four dots at the top of the matrix and one dot at the bottom.

Having set up the italic-font shift condition, the character tilt will persist until the end of the printed line, unless means are provided for cancelling the condition for example by means of an italic-font reset code. The function of the italic-font reset code would be such that further space increments are inserted into the line, but this time the top row of the matrix would have only a one-dot increment inserted and the bottom row of the matrix would have four. This would restore the uprightness of all subsequent characters in the line. Unless the italic-font reset code is preceded in the same line by the italic-shift reset code, it will have the effect of tilting all subsequent characters to the left. Even so, it is not unreasonable that this configuration might, itself, be considered as an additional font.

In the simple arrangement outlined in preceding paragraphs, reversion to the standard font would be automatic when the distributors 8 and 11 are reset at the end of the complete character-line, and the shift code has been removed from the line store. Hence, if continuous italic printing is desired it will be necessary to reinsert the italic-font shift code at the beginning of each line.

From the figures quoted in a preceding paragraph, the overall "slope" of the italic characters i.e., lower and higher case letters for example, is three dots in a total height of 15 dots and in practice these figures would lead to a "stepped" rather than a "sloped" character. The visual effect could be improved by using a larger number of dots in the matrix.

However, as shown in FIG. 3, for an 11×15 matrix, an italic "H" is provided by displacing rows A, B, C and D by four dots, rows E, F, G and H by three dots, rows I, J, K and L by two dots and rows M, N and O by one dot.

It is therefore sufficient to provide an additional row of four cores to achieve the desired result and this arrangement of the character generation system could be arranged in the manner illustrated in the drawing according to FIG. 1C in that the output wire 13 would be arranged to link the four additional cores which would also be linked by an italic-shift wire output of the decoder 6, and the reset unit 10 would serve the same function.

Thus the four additional cores are set each time the italic-shift code is read out of one of the line stores and if any one of these cores is reset an output signal will be generated on the wire 13 thereby causing the reset unit 10 to reset the character-dot distributor 8 and to cause the contents of one of the line stores to be stepped along by an amount equivalent to one character-code i.e., in the quoted example the next six bits of the stored information would be applied to the converter 5. For the purposes of this description these cores will be designated W, X, Y and Z. Core W is linked by dot-access wire 4 and also by row-access wires A, B, C and D. Core X is linked by dot-access wire 3 and also by wires E, F, G and H. Core Y is linked by wire 2 and by wires I, J, K and L. Core Z is linked by wire 1 and by wire M, N and O.

In operation, the cores will only be reset by a coincidence of currents in the appropriate row and dot windings, hence, by the mechanism described earlier, the top four rows will receive a four-dot inserted space increment, the next four an increment of three dots, the next four an increment of two dots and the lower three an increment of one dot. All characters subsequent to the italic-shift code will thus receive the desired italic distortion. It will be evident that the italic-reset code can perform its function by a similar, but inverted, disposition of a further four cores. The figures given above are by way of example only, and it will be clear that the effect may be varied by adopting other winding configurations.

The character generation system according to the invention when used in conjunction with an electrographic printing and/or display apparatus may be modified in order to facilitate the printing and/or viewing of bold characters, by converting a standard font i.e., as shown in the drawing to FIG. 1B into a bold font by artificially broadening the vertical lines of the characters since bold characters are typified in one respect by the fact that their vertical lines are appreciably thicker than their horizontals.

In the basic character generation system outlined in preceding paragraphs, energizing a dot-access wire will read out the dot, if present, from the matrix 7 directly into the currently alerted recording head. In order to generate the broadened verticals to create a bold character it is necessary to provide a bold-font shift arranged to amend the operating mode of the basic system in a manner which is symbolized in the drawing according to FIG. 4.

It will be assumed by way of example that the desired character shape can be achieved by broadening the verticals to three times their original width.

Figure 4:
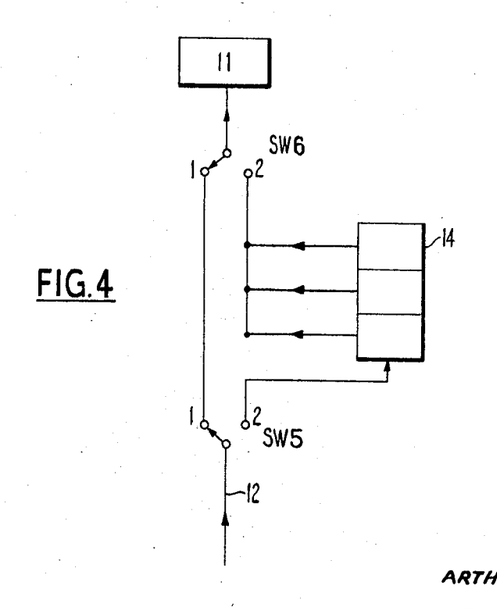
FIG. 4 illustrates the operating mode of the character generation system according to the invention when generating a bold font.

Referring to FIG. 4, the matrix output winding 12 which is normally connected to the head-pulse distributor 11 via contact positions 1 on switches SW5 and SW6 is diverted via contact position 2 on the switch SW5 to drive a three-stage shift register 14. The recording head input circuits are also diverted via contact position 2 on the switch SW6 so that a pulse output from any one of the three stages of the register 14 will write a dot into the currently-alerted recording head.

In operation, any given dot output from the matrix 7 will be stepped through the register 14 at the basic clock rate and will therefore remain available to drive three successive recording heads before passing out of the register 14, thereby achieving the desired effect. It will be evident that in the general case when the requirement is to broaden the verticals by N-times then an N-stage register would be required.

Assuming, as before, that a one-dot interval is required in which to handle the shift code, the bold-shift output is also made to set P core 1 therefore a one-dot space will be interposed while the font shift is taking place. As before, all characters subsequent to the bold-font shift will adopt the bold configuration. However, in the present case the shift will not automatically revert at the end of a character line, since the shift will be a positive switching function and does not depend upon relative displacement of the distributor settings. The reversion to the standard font will be achieved by providing a bold-shift reset code which will be arranged to return the two switches SW5 and SW6 to their normal positions i.e., contact positions 1.

It should be noted that the introduction of a bold-font shift code at a position other than the extreme left hand end of a character line, if not accompanied by a bold-reset shift code later in the line, will impose bold characteristics on the characters which precede the application of the bold-font shift code in that their first dot-row will be correct but the remaining rows will be bold.

It is therefore necessary in order to obviate this limitation to arrange that the bold shift is reset every time the head-pulse distributor resets. This solves the problem, but means that the bold-shift condition is not carried forward from one character-line to the next. As in the italic-shift case, it will be necessary to insert a bold-shift code at the beginning of every bold line of characters, even though the whole text might be bold. In both cases it would be possible, with suitable circuit additions, to retain the font-shift information and reintroduce it at the beginning of each line until cancelled, without the need to include repeated font-shift codes in the data input stream.

The effect of the broadening process is to spread the character towards the next adjacent character and in a practical system the tendency to overlap could be avoided by tailoring the standard font to make due allowance for the effect.

Given a standard dot matrix definition, for example 160 dots per inch, the accuracy with which a given character may be simulated by the dot pattern will depend upon the size of the character in relation to the basic dot-interval. In practice, therefore, to generate a character 1 inch wide by 1 inch high it is preferable to use a matrix of 160 by 160 dots and take advantage of the very good definition thereby attainable. However, the balance of economy against print quality might make it acceptable to start with a smaller matrix and electronically enlarge the images during the printing process. This could be achieved by making appropriate switching changes in the logic circuitry of the character generation system. By way of example the process of increasing the character to twice the original matrix size will be outlined, assuming that the head-pulse distributor runs at its normal clock rate and the drum speed remains unchanged. Then, in order to double the character width, the horizontal scan rate in the matrix is halved and any dot outputs will be stored for long enough to be recorded by two adjacent heads. In order to double the character height each row access line remains energized until two dot scans have been completed, the selected character shape being inserted twice during this period. Hence each dot-row will be read out twice onto the drum. Clearly, any other multiple of the basic size can be obtained by choosing the appropriate relative scanning speeds.

Experiments have shown that the above process, not unexpectedly, gives aesthetically unsatisfying results if the original matrix is too small, say, less than about 25 dots in height. The alternative therefore is to use a larger matrix and generate the smaller characters by a division process. The required sequence to obtain a half-sized character, for example, would be to scan the matrix at twice the relative speed and to print out only the alternate dot and row information. Experimental results of this process showed that a large-matrix character, so reduced, appears subjectively to be more accurately shaped than the apparently optimum choice of dot structure derived from the same character projected onto a matrix half the size.

Since the storage matrices outlined in preceding paragraphs depend on coincident current access, the cores of the matrices cannot be overdriven to effect faster switching than normal. This is a significant factor since it would enable larger cores to be used thereby giving a larger winding area and more translations per core.

Figure 5:
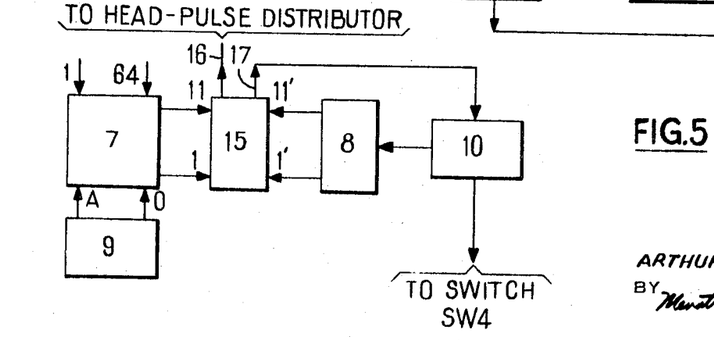
FIG. 5 illustrates part of the character generation system according to the invention having two storage matrices.

In order therefore to effect faster switching by overdriving the cores and at the same time retain the facilities provided by the character generation systems outlined in preceding paragraphs it will be necessary, as shown in FIG. 5 which illustrates part of the character generation systems according to the invention, to provide two storage matrices 7 and 15. The contents of the line storage unit i.e., each of the plurality of coded characters will be sequentially applied to the storage matrix 7, in a manner as previously described i.e., via one of the wires 1 to 64 which links the cores of the matrix 7 in a configuration appropriate to a desired character shape and the output of this storage matrix will be applied to the storage matrix 15.

The storage matrix 7 will for example be as shown in the drawing according to FIG. 1B i.e., an 11×15 matrix and the storage matrix. One will be formed by an 11×2 matrix. One of the two rows of this matrix will perform a similar function to the "P" row of cores shown in the drawing according to FIGS. 2A and 2B and will therefore for clarity be referred to as the P cores.

The storage matrix 7 apart from the character wires 1 to 64 is provided with row access A to O and a separate output wire i.e., the wires 1 to 11 for each of the columns thereof and the storage matrix 15 is provided with column access wires 1' to 11' which link both rows of cores and a separate output wire for each of the rows thereof i.e., the wires 16 and 17.

In operation, each of the character wires which links the cores of the storage matrix 7 in a configuration appropriate to a desired character shape will also link one of the P cores of the storage matrix 15 in order to facilitate the provision of a reset signal for application to the character-dot distributor 8 after the required number of steps have been completed. The particular core chosen will be arranged to correspond with the last dot embraced by the increment required by that character width and the output wire which links all the P cores i.e., the wire 17 will be connected to the character-dot distributor 8 via the reset unit 10 and will therefore reset it immediately upon an output pulse appearing on the wire 17, and as before the reset unit 10 is arranged such that the next character will be formed in the storage matrix 7.

Each character is sequentially generated in the storage matrix 7 by switching the required cores with a character write pulse on the appropriate character wire and the appropriate P core alerted.

Once the character has been written into the storage matrix 7, access wire A, for the top row of dots i.e., the first part of a character to be recorded, is energized from the selector unit 9 by a read pulse i.e., of opposite polarity to the write pulse thereby interrogating the top row of dots and any core in the row which has been set by the character write pulse will be reset to its original state by this pulse thus generating corresponding signals at the output of the matrix which are applied to the storage matrix 15 to set the appropriate cores of the other of the rows thereof which will hereinafter be referred to as the first row. In order to effect the faster switching action the read pulse is arranged to overdrive the cores.

The column-access wires 1' to 11' of the storage matrix 15 are sequentially energized from the distributor 8 by read pulses in the order 1, 2, 3, 4, 5, etc., while the recording heads 1 are also alerted in the same succession. The output winding of the first row of cores of the storage matrix 15 i.e., the wire 16 is connected to the recording heads 18 via the head-pulse distributor 11 such that an output which might occur at any given sampling instant will drive the recording head which happens to be alerted at that instant to write a dot on the drum 20. As the character-dot increments are successively read out, the point will be reached at which the P core will also be reset. The resetting of the P core will as previously stated immediately reset the character-dot distributor 8 and the sequence for the next character will begin i.e., the next character will be generated in the storage matrix 7 and the process repeated.

As before, this mechanism will operate as each row of cores of the storage matrix 7 is read out, so the same space allocation will be maintained for the complete printing of that character.

The P cores of the storage matrix 15 of this arrangement may also be utilized in a similar manner to effect the feature of line justification.

The provision of an italic font with this arrangement can be achieved by providing the storage matrix 15 with an additional row of cores i.e., a row of four cores for the example quoted in a preceding paragraph, which will all be linked by an output wire and an italic-shift code wire thereby alerting the additional row of cores when the italic font is required. A number of column access wires of the storage matrix 15 each link separate cores of the additional row i.e., column-access wires 1, 2, 3 and 4 each link one of the four cores in the example quoted in a preceding paragraph and each core of the additional row which is linked by a column-access wire is also linked with a wire which is associated with a number of row-access wires of the storage matrix 7 i.e., for the example quoted in a preceding paragraph row-access wires A, B, C and D will be associated with a wire which links one of the four cores of the additional row, row-access wires E, F, G and H will be associated with a wire which links another one of the four cores, row-access wires I, J, K and L will be associated with a wire which links a further one of the four cores and row-access wires M, N and O will be associated with the other of the four cores. The association of each of the four wires with the corresponding row-access wires is such that the same one of the four cores is interrogated to give an output signal to reset the character-dot distributor 8 after the contents of each of the four rows have been interrogated, passed to the storage matrix 15 and interrogated in the storage matrix 15.

The storage matrix 15 may be utilized to provide the features of a bold font and variation of the overall character size in a manner as outlined in preceding paragraphs for these features.

It should be noted that the various aspects of the character generation systems outlined in the preceding paragraphs are not mutually exclusive. The width, spacing, size and font changing facilities outlined can all be exploited in the same system, mostly sharing the use of the same functional units.

It should also be noted that a byproduct of the method for achieving font shift is that the italic-shift and bold-shift distortions can be applied simultaneously thereby giving rise to an additional font (i.e., a bold italic font).

It should further be noted that the use of a ferrite-core matrix, in the character generation systems outlined in the preceding paragraphs, is merely a convenience for outlining the concepts of the invention. The same functional details could be achieved by a number of other circuit techniques and storage mechanisms. In practice, a core matrix might be the least favored, since, used in the manner described, it would confine the electrographic printer and/or display apparatus for example to working at less than the very high speed at which it is capable of working.

I claim:

1. A character generation system comprising:
   a. first means for assembling and storing a line of characters in the order received, said first means providing for a cyclic and sequential readout of the characters;
   b. converter and decoder means coupled to said first means for generating in response to each sequentially received coded character a discrete signal on a corresponding one of Y-output character-wires;
   c. a translation matrix of N×M switchable elements, coupled to said Y-output character-wires, for cyclically forming therein a particular character shape by the setting of associated ones of said elements in response to said discrete signal on the output character-wire corresponding thereto, said matrix having an N+1th row the elements of which are coupled to predetermined ones of said Y-output character-wires in accordance with the associated width of the character corresponding to a character-wire;
   d. second means including a selector unit for applying a sensing pulse to a row of said translation matrix while each stored character is being read out of said first means, said second means sequentially applying said sensing pulse to a successive adjacent one of the N-rows of said translation matrix following each readout cycle of said first means, said second means further including a character-dot distributor for applying in synchronization with said selector unit a series of M pulses to the elements of a row selected by said selector unit in one-to-one correspondence therewith, causing in response thereto the generation of signals at the output of said matrix representative of the form of a corresponding portion of a character, the coincidence of a pulse from said distributor with said selector pulse triggering a set element in said N+1th row and providing thereby an output signal which is indicative of the width of the character then stored in said matrix; and
   e. character generating means, responsive to each output signal from said translation matrix and synchronized with said second means, for coupling to recording means the signal portions of each of said line of characters in said first means to be printed out, said character generating means including third means responsive to the width-indicating signal associated with the character in said translation matrix for resetting said character-dot distributor and causing said distributor and said first means to initiate the sequence for the next character to be cyclically read out of said first means, thereby automatically controlling the spacing between characters as coupled to the recording means by said character-generating means in dependence of each said width-indicating signal, the cyclic reading of the contents of said first means being repeated until signals representative of all portions of the complete form of each character in said line of characters has been directed to the recording means by said character-generating means.

2. The character generation system as claimed in claim 1 wherein said first means further include a line input unit and two line stores which alternate their function under the control of a changeover logic unit in a manner such that they are either coupled to said line input unit or to said translation matrix, the function interchange being initiated when the data in one of the line stores has been transferred to the character-generating means and when the other line store has been filled with incoming data.

3. The character generation system as claimed in claim 1 further including a second matrix coupled to said translation matrix, wherein part of each one of said plurality of characters is sequentially formed in said second matrix by sequentially applying each of said characters from said first means to said translation matrix via one of Y (number of characters the system can generate) character-wires to form a particular character therein, and then applying interrogation pulses to said translation matrix in order to sense the character therein, the interrogation pulses causing signals to be generated at the output of said translation matrix corresponding to the form of part of the character, which signals are simultaneously applied to said second matrix to form said part of the character therein.

4. The character generation system as claimed in claim 2 wherein said matrix is a ferrite-core storage matrix.

5. The character generation system as claimed in claim 2 wherein each of said Y character-wires is threaded through the elements of the translation matrix which correspond to the shape of a particular character.

6. The character generation system as claimed in claim 1 wherein in order to facilitate the interrogation of said translation matrix in relation to the width of the character formed therein, said translation matrix is provided with a row of elements which is additional to the normal storage requirements; wherein each one of said Y character-wires is arranged to link a separate one of the elements of said additional row, the element being linked forming part of one of the columns of said translation matrix which is not embraced by the character formed therein by that character-wire; wherein an access wire is threaded through the elements of each row and each column of said translation matrix to facilitate the interrogation of said translation matrix, each element of said additional row being linked by a separate one of said column-access wires in a manner such that the access current in said wire is sufficient to reset the element which it links; wherein a first output wire which links the elements of said additional row is connected to means for initiating the formation of another character in said translation matrix and the rescanning of said columns of said translation matrix; and wherein a second output wire links the remaining elements of said translation matrix, the signals generated therein being directed to the appropriate channels of said character-generating means.

7. The character generation system as claimed in claim 3 wherein in order to facilitate the interrogation of said matrices in relation to the width of the character formed therein, said second matrix is formed by two rows of elements, the elements in each one of the rows being linked by a separate output wire; wherein each one of said Y character-wires which is threaded through the elements of said translation matrix is arranged to link a separate one of the elements of one of said second matrix rows, the element being linked forming part of one of the columns of said second matrix which is not embraced by the character formed therein; wherein separate access-wires are threaded through the elements of each row of the said translation matrix and through the elements of each column of said second matrix; wherein a separate output-wire is threaded through the elements of each column of said translation matrix; wherein the output-wire which is threaded through said one of the rows of said second matrix is connected to means for initiating the formation of another character in said translation matrix and the rescanning and interrogation of said matrices; and wherein the signals which are generated in the output-wire which is threaded through the other of said rows of said second matrix are directed to the appropriate channels of said character-generating means.

8. The character generation system as claimed in claim 6 wherein means for varying the spacing between characters is provided by allocating a character code to each of the required space increments separating adjacent characters, the character wire associated with a space increment code being arranged to link only one of the elements in said N+1th row of elements, the elements being linked determining the number of space increments between characters.

9. The character generation system as claimed in claim 7 wherein means for varying the spacing between characters is provided by allocating a character code to each of the required space increments, the character wire associated with a space increment code being arranged to link only one of the elements in said one of the rows of said second matrix, the element being linked determining the number of space increments between characters.

10. The character generation system as claimed in claim 1 further comprising means for converting an upright font into an italic font, including delay means for inserting a variable delay of a number of element increments between the alerting of the appropriate input channels of said character-generating means and the translation matrix sequential scanning action, the delay being made greatest during the interrogation of the first row of the translation matrix and being progressively reduced during the interrogation of each of the subsequent rows, thereby obtaining an italic font.

11. The character generation system as claimed in claim 10 wherein the insertion of said variable delay is effected by including a further additional row (N+2th) of elements in said translation matrix and a character delay code which is associated with a character delay code wire arranged to link only the elements of said N+2th row; wherein Z (equal to the number of delay increments) column-access wires each link separate elements of said N+2th row, the column-access wire which links an element determining the character delay wherein each of the elements of said N+2th row which are linked by one of said Z column-access wires is also linked by a number of row-access wires; and wherein an output wire is threaded through the elements of said N+2th row which is connected to means for initiating the formation of another character in said translation matrix and the rescanning and interrogation thereof.

12. The character generation system as claimed in claim 3 further comprising means for converting an upright font into an italic font, including delay means for inserting a variable delay of a number of element increments between the alerting of the appropriate input channels of said character-generating means and the second matrix sequential scanning action, the delay being made greatest during the interrogation of the first row of the translation matrix and being progressively reduced during the interrogation of each of the subsequent rows, thereby obtaining an italic font; wherein the insertion of said variable delay is effected by including an additional row of elements in said second matrix and a character delay code which is associated with a character delay code wire that is arranged to link only the elements of said additional row; wherein Z (equal to the number of delay increments) column-access wires of said second matrix each link separate elements of said additional row, the column-access wire which links an element determining the character delay; wherein each of the cores of said additional row which are linked by one of said Z column-access wires is also linked by a wire which is associated with a number of row-access wires of said translation matrix; and wherein an output wire is threaded through the elements of said additional row which is connected to means for initiating the formation of another character in said translation matrix and the rescanning and interrogation of said matrices.

13. The character generation system as claimed in claim 1 further including means for converting a standard font into a bold font by effecting via said character-generating means a broadening of the vertical parts of a character formed in the translation matrix.

14. The character generation system as claimed in claim 13 wherein said means for converting a standard font into a bold font include bold-font shift and reset character codes and a W (equal to the number of element increments by which the vertical parts of a character need to be broadened) stage shift register interposed between the output of the sequentially scanned translation matrix and the input channels of said character-generating means which is operative under the control of said bold-font shift and reset codes, and wherein any signal corresponding to the vertical part of a character directed to said character-generating means will be passed through said shift register and directed via W successive input channels of said character-generating means thereby effecting the broadening of said standard font.

15. The character generation system as claimed in claim 1 further including means for varying at said character-generating means the overall size of a character as formed in the translation matrix.

16. The character generation system as claimed in claim 15 wherein in order to increase the width of a character by T-times its basic width, the sequential scanning rate of the columns of a storage matrix is reduced by an amount 1/T while the rate of sequentially alerting the appropriate input channels of said character-generating means remains unchanged, thereby any signal generated during the sequential scanning of said columns is directed via T successive input channels of said character-generating means.

17. The character generation system as claimed in claim 15 wherein in order to increase the height of a character by H-times its basic height, at least part of each one of said plurality of characters is successively formed H times into a storage matrix and each row of the storage matrix is successively interrogated and sequentially scanned H times.

18. The character generation system as claimed in claim 15 wherein in order to reduce the width of a character by an amount 1/T of its basic width, the sequential scanning rate of the columns of a storage matrix is increased by an amount T while the rate of sequentially alerting the appropriate input channels of said character-generating means remains unchanged, thereby during the sequential scanning of said columns only 1/T of the signals generated thereon will be directed via said input channels of said character-generating means.

19. The character generation system as claimed in claim 15 wherein in order to reduce the height of the character by 1/H times its basic height, only 1/H of the rows of a storage matrix is interrogated and scanned.

* * * * *